United States Patent
Haque et al.

(10) Patent No.: US 10,419,778 B2
(45) Date of Patent: Sep. 17, 2019

(54) JCTVC-L0227: VPS_EXTENSION WITH UPDATES OF PROFILE-TIER-LEVEL SYNTAX STRUCTURE

(71) Applicant: SONY CORPORATION, Tokyo (JP)

(72) Inventors: Munsi Haque, San Jose, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 554 days.

(21) Appl. No.: 14/035,740

(22) Filed: Sep. 24, 2013

(65) Prior Publication Data

US 2014/0192859 A1 Jul. 10, 2014

Related U.S. Application Data

(60) Provisional application No. 61/748,898, filed on Jan. 4, 2013.

(51) Int. Cl.
*H04N 19/597* (2014.01)
*H04N 19/70* (2014.01)
*H04N 19/30* (2014.01)

(52) U.S. Cl.
CPC ........... *H04N 19/597* (2014.11); *H04N 19/30* (2014.11); *H04N 19/70* (2014.11)

(58) Field of Classification Search
CPC ....... H04N 19/70; H04N 19/30; H04N 19/597
See application file for complete search history.

(56) References Cited

U.S. PATENT DOCUMENTS

| | | |
|---|---|---|
| 5,956,026 A | 9/1999 | Ratakonda |
| 8,938,004 B2 | 1/2015 | Boyce et al. |
| 2008/0310500 A1 | 12/2008 | Winger |
| 2010/0254458 A1 | 10/2010 | Amon |
| 2011/0286530 A1 | 11/2011 | Tian et al. |
| 2012/0075436 A1 | 3/2012 | Chen |
| 2012/0163452 A1 | 6/2012 | Horowitz |
| 2012/0207227 A1 | 8/2012 | Tsai |
| 2012/0229602 A1 | 9/2012 | Chen |
| 2012/0230431 A1 | 9/2012 | Boyce |
| 2012/0275517 A1 | 11/2012 | Boyce et al. |

(Continued)

FOREIGN PATENT DOCUMENTS

| | | |
|---|---|---|
| JP | 2008-536420 A | 9/2008 |
| JP | 2010-516099 A | 5/2010 |

OTHER PUBLICATIONS

Gary J. Sullivan, Overview of the High Efficiency Video Coding (HEVC) Standard, IEEE transactions on Circuits and System for Video Technology, Dec. 2012, pp. 1649-1668, Vo., 22, No. 12.

(Continued)

*Primary Examiner* — Neil R Mikeska
(74) *Attorney, Agent, or Firm* — Chip Law Group

(57) ABSTRACT

The profile_tier_level syntax structure of a High Efficiency Video Coding (HEVC) syntax structure is updated to provide more flexibility for use in the vps_extension( ) syntax structure for use in each layer or operating point. A new flag 'LevelPresentFlag' is added in profile_tier_level syntax structure to support the variance of Level parameters separately from the Profile/Tier Parameter. The update to the profile_tier_level syntax structure provides flexibility in selecting profile_tier and level parameters for HEVC selections in scalable video coding, multi-view coding and 3D video coding areas.

7 Claims, 4 Drawing Sheets

(56) References Cited

U.S. PATENT DOCUMENTS

| | | | |
|---|---|---|---|
| 2013/0089134 | A1 | 4/2013 | Wang et al. |
| 2013/0107942 | A1 | 5/2013 | Chen et al. |
| 2013/0182755 | A1 | 7/2013 | Chen et al. |
| 2013/0266077 | A1* | 10/2013 | Boyce .................... H04N 19/70 375/240.25 |
| 2013/0279564 | A1 | 10/2013 | Wang |
| 2013/0287115 | A1 | 10/2013 | Wang |
| 2013/0294499 | A1* | 11/2013 | Wang .................... H04N 19/70 375/240.02 |
| 2013/0294500 | A1 | 11/2013 | Wang |
| 2013/0343465 | A1 | 12/2013 | Chen |
| 2014/0003491 | A1 | 1/2014 | Chen |
| 2014/0003492 | A1* | 1/2014 | Chen .................... H04N 19/597 375/240.02 |
| 2014/0078249 | A1* | 3/2014 | Wang .................... H04N 19/597 348/43 |
| 2014/0086303 | A1* | 3/2014 | Wang .................... H04N 19/70 375/240.02 |
| 2014/0086333 | A1* | 3/2014 | Wang .................... H04N 19/70 375/240.25 |
| 2014/0086334 | A1 | 3/2014 | Haque |
| 2014/0092996 | A1* | 4/2014 | Wang .................... H04N 19/70 375/240.26 |
| 2014/0181885 | A1* | 6/2014 | Rusert ............ H04N 21/234327 725/131 |
| 2014/0192858 | A1 | 7/2014 | Haque et al. |
| 2014/0192859 | A1 | 7/2014 | Haque et al. |
| 2014/0294063 | A1* | 10/2014 | Chen .................... H04N 19/105 375/240.02 |
| 2014/0301451 | A1* | 10/2014 | Deshpande .......... H04N 19/597 375/240.12 |
| 2015/0023434 | A1* | 1/2015 | Schierl .................... H04N 19/70 375/240.26 |
| 2015/0245046 | A1* | 8/2015 | Tsukuba ................. H04N 19/70 375/240.25 |

OTHER PUBLICATIONS

Miska M. Hannuksela, et al.,"VPS Extension Design", Joint Collaborative Team Video Coding (JCT-VC) of ITU-T, SF 16WP 3 and ISO/IEC JTC 1/SC 29/WG 11, 11th Meeting: Shanghai, CN, Oct. 10-19, 2012, pp. 1-8 Document JCTV-K0274.
Jill Boyce,"NAL Unit Header and Parameter Set Designs for HEVC Extensions", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-8, Document JCTV-K1007.
Jill Boyce,"VPS Syntax for Scalable and 3D Extensions", VIDYO Person Telepresence, Document, JCTVC-K0204, pp. 1-14.
Munsi Haque,"On Support of Mixed Video Sequences in High Level Syntaxes", Joint Collaborative Team on Video Coding (JCT-VC) of ITU-T SG 16 WP 3 and ISO/IEC JTC 1/SC 29/WG 11, 11th Meeting: Shanghai, CN, Oct. 9-19, 2012, pp. 1-7, Document JCTV-K0232, WG11 No. m26564.
Benjamin Bross,"High Efficiency Video Coding (HEVC) Test Specification Draft 9", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-317, Document JCTV-K1003.
Extended European Search Report for EP Patent Application No. 13870094.3, dated Sep. 28, 2016, 09 pages.

Munsi Haque, "VPS Extension with Updates of Profile-Tier-Level Syntax Structure", Joint Collaborative Team on Video Coding (JCT-VC) of ITU-T SG 16 WP 3 and ISO/IEC JTC 1/SC 29/WG 11, Jan. 14-23, 2013, 07 pages.
Chen, et al., "3D-HLS:Video Parameter Set for 3D-HEVC", Joint Collaborative Team on 3D Video Coding Extension Development of ITU-T SG 16 WP 3 and ISO/IEC JTC 1/SC 29/WG 11, Jul. 16-20, 2012, 15 pages.
Ye-Kui Wang, "BoG on High-Level Syntax for Extension Planning", Joint Collaborative Team on 3D Video Coding Extension Development of ITU-T SG 16 WP 3 and ISO/IEC JTC 1/SC 29/WG 11, Jul. 16-20, 2012, 17 pages.
Boyce, et al., "SEI Message for Profile and Level Signaling for Temporal Scalability and Extensions", Joint Collaborative Team on Video Coding (JCT-VC) of ITU-T SG 16 WP 3 and ISO/IE C JTC 1/ SC 29/WG 11, Jul. 10-20, 2012, 06 pages.
Office Action received for Japanese Patent application No. 2015-551696, dated Jun. 28, 2016, 4 pages of office action.
Ye-Kui Wang et al, "AHG9:On video parameter set", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 9.
Office Action Received for Korean Patent Application No. 10-2015-7017673, dated Jul. 15, 2016, 9 Pages of Office Action Including 4 Pages of English Translation.
Benjamin Bross et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 318.
Wang, et al, "AHG9: On Video Parameter Set", Joint Collaborative Team on Video Coding (JCT-VC) of ITU-T SG 16 WP 3 and ISO/IEC JTC 1/SC 29, WG 11, JCTVC-K0125, 11th Meeting: Shanghai, CN, Oct. 10-19, 2012, pp. 38.
Office Action for CN Patent Application No. 201380069289.6, dated Aug. 2, 2017, 07 pages of Office Action and 10 pages of English Translation.
Office Action for JP Patent Application No. 2017-042687, dated Jan. 30, 2018, 04 pages of Office Action and 03 pages of English Translation.
Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v13, 11th meeting, Shanghai, Oct. 10-19, 2012, 05 pages.
Jill Boyce, "VPS Syntax for Scalable and 3D Extensions", Joint Collaborative Team on Video Coding (JCT-VG) of ITU-T SG16 WP3 and ISO/IEC JTC1/SC29/WG11, JCTVC-K0204, 11th meeting, Shanghai, Oct. 10-19, 2012, 07 pages.
Office Action for KR Patent Application No. 10-2017-7004602, dated Dec. 6, 2018, 05 pages of Office Action and 03 pages of English Translation.
Wang, et al, "AHG9: On Video Parameter Set", Joint Collaborative Team on Video Coding (JCT-VC) of ITU-T SG 16 WP 3 and ISO/IEC JTC 1/SC 29/WG 11, 11th Meeting, Shanghai, JCTVC-K0125, Oct. 10-19, 2012, 08 pages.
European Communication issued in Appln. No. 13 870 094.3 dated Jul. 26, 2019.
Hannuksela et al., "Draft Text for Scalable Extensions of High Efficiency Video Coding (HEVC)," Joint Collaborative Team on Video Coding (JCT-VC) of ITU-T SG16 WP3 and ISO/IEC JTC1/SC29NVG11, 11th Meeting: Shanghai, CN Oct. 10-19, 2019.

* cited by examiner

JCTVC-L0227: VPS_EXTENSION WITH UPDATES OF PROFILE-TIER-LEVEL SYNTAX STRUCTURE

CROSS-REFERENCE TO RELATED APPLICATION(S)

This application claims priority under 35 U.S.C. § 119(e) of the U.S. Provisional Patent Application Ser. No. 61/748,878, filed Jan. 4, 2013 and titled, "JCTVC-L0XXX: VPS_EXTENSION WITH UPDATES OF PROFILE-TIER-LEVEL SYNTAX STRUCTURE," which is hereby incorporated by reference in its entirety for all purposes.

FIELD OF THE INVENTION

The present invention relates to the field of video encoding. More specifically, the present invention relates to high efficiency video coding.

BACKGROUND OF THE INVENTION

The Video Parameter Set (VPS) has been added as metadata to describe the overall characteristics of coded video sequences, including the dependencies between temporal sublayers. The primary purpose of this is to enable the compatible extensibility of the standard in terms of signaling at the systems layer, e.g., when the base layer of a future extended scalable or multiview bitstream would need to be decodable by a legacy decoder, but for which additional information about the bitstream structure that is only relevant for the advanced decoder would be ignored.

SUMMARY OF THE INVENTION

The profile_tier_level syntax structure of a High Efficiency Video Coding (HEVC) syntax structure is updated to provide more flexibility for use in the vps_extension( ) syntax structure for use in each layer or operating point. A new flag 'LevelPresentFlag' is added in profile_tier_level syntax structure to support the variance of Level parameters separately from the Profile/Tier Parameter. The update to the profile_tier_level syntax structure provides flexibility in selecting profile_tier and level parameters for HEVC selections in scalable video coding, multi-view coding and 3D video coding areas.

In one aspect, a method programmed in a non-transitory memory of a device. The method comprises acquiring content and generating a video parameter set of the content utilizing a level flag indicating a level within the content. The flag is an external passing parameter. The flag is added syntax within a profile_tier_level syntax structure. Generating the video parameter set includes using a profile present flag, further wherein when the profile present flag is equal to 1, then profile information for a layer is present in a profile tier level syntax structure, and when the profile present flag is equal to 0, then the profile information for the layer is not present in the profile tier level syntax structure. Generating the video parameter set includes using a profile reference layer number, further wherein when the profile present flag is equal to 0, then profile information for the layer is inferred to be equal to the profile information of the layer indicated by the profile reference layer number. Generating the video parameter set includes using a level present flag, further wherein when the level present flag is equal to 1, then level information for a layer is present in a profile tier level syntax structure, and when the level present flag is equal to 0, then the level information for layer is not present in the profile tier level syntax structure. Generating the video parameter set includes using a level reference layer number, further wherein the level reference layer number is equal to 0, level information for a layer is inferred to be equal to the level information of the layer indicated by the level reference layer number. Generating the video parameter set includes using a profile present flag, further wherein when this flag is equal to 1, then profile information for an operation point is present in a profile tier level syntax structure, and when this flag is equal to 0, then the profile information for the operation point is not present in the profile tier level syntax structure. Generating the video parameter set includes using a profile reference layer number, further wherein when the profile present flag is equal to 0, then profile information for the operation point is inferred to be equal to the profile information of the operation point indicated by the profile reference layer number. Generating the video parameter set includes using a level present flag, further wherein when the level present flag is equal to 1, then level information for a operation point is present in a profile tier level syntax structure, and when the level present flag is equal to 0, then the level information for the operation point is not present in the profile tier level syntax structure. Generating the video parameter set includes using a level reference layer number, further wherein the level reference layer number is equal to 0, level information for a operation point is inferred to be equal to the level information of the operation point indicated by the level reference layer number. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, a method programmed in a non-transitory memory of a device comprises acquiring content and generating a video parameter set of the content utilizing a level flag indicating a level within the content, wherein generating the video parameter set includes using a profile present flag, further wherein when the profile present flag is equal to 1, then profile information for a layer is present in a profile tier level syntax structure, and when the profile present flag is equal to 0, then the profile information for the layer is not present in the profile tier level syntax structure, further wherein when the profile present flag is equal to 0, then profile information for the layer is inferred to be equal to the profile information of the layer indicated by the profile reference layer number, further wherein when the level present flag is equal to 1, then level information for a layer is present in a profile tier level syntax structure, and when the level present flag is equal to 0, then the level information for layer is not present in the profile tier level syntax structure, further wherein the level reference layer number is equal to 0, level information for a layer is inferred to be equal to the level information of the layer indicated by the level reference layer number.

In another aspect, an apparatus comprises a non-transitory memory for storing an application, the application for acquiring content and generating a video parameter set of the content utilizing a level flag indicating a level within the content and a processing component coupled to the memory, the processing component configured for processing the application. The flag is an external passing parameter. The flag is added syntax within a profile_tier_level syntax structure. Generating the video parameter set includes using a profile present flag, further wherein when the profile present flag is equal to 1, then profile information for a layer is present in a profile tier level syntax structure, and when the profile present flag is equal to 0, then the profile information for the layer is not present in the profile tier level syntax structure. Generating the video parameter set includes using a profile reference layer number, further wherein when the profile present flag is equal to 0, then profile information for the layer is inferred to be equal to the profile information of the layer indicated by the profile reference layer number. Generating the video parameter set includes using a level present flag, further wherein when the level present flag is equal to 1, then level information for a layer is present in a profile tier level syntax structure, and when the level present flag is equal to 0, then the level information for layer is not present in the profile tier level syntax structure. Generating the video parameter set includes using a level reference layer number, further wherein the level reference layer number is equal to 0, level information for a layer is inferred to be equal to the level information of the layer indicated by the level reference layer number. Generating the video parameter set includes using a profile present flag, further wherein when this flag is equal to 1, then profile information for an operation point is present in a profile tier level syntax structure, and when this flag is equal to 0, then the profile information for the operation point is not present in the profile tier level syntax structure. Generating the video parameter set includes using a profile reference layer number, further wherein when the profile present flag is equal to 0, then profile information for the operation point is inferred to be equal to the profile information of the operation point indicated by the profile reference layer number. Generating the video parameter set includes using a level present flag, further wherein when the level present flag is equal to 1, then level information for a operation point is present in a profile tier level syntax structure, and when the level present flag is equal to 0, then the level information for the operation point is not present in the profile tier level syntax structure. Generating the video parameter set includes using a level reference layer number, further wherein the level reference layer number is equal to 0, level information for a operation point is inferred to be equal to the level information of the operation point indicated by the level reference layer number.

DETAILED DESCRIPTION OF THE PREFERRED EMBODIMENT

Figure 1:
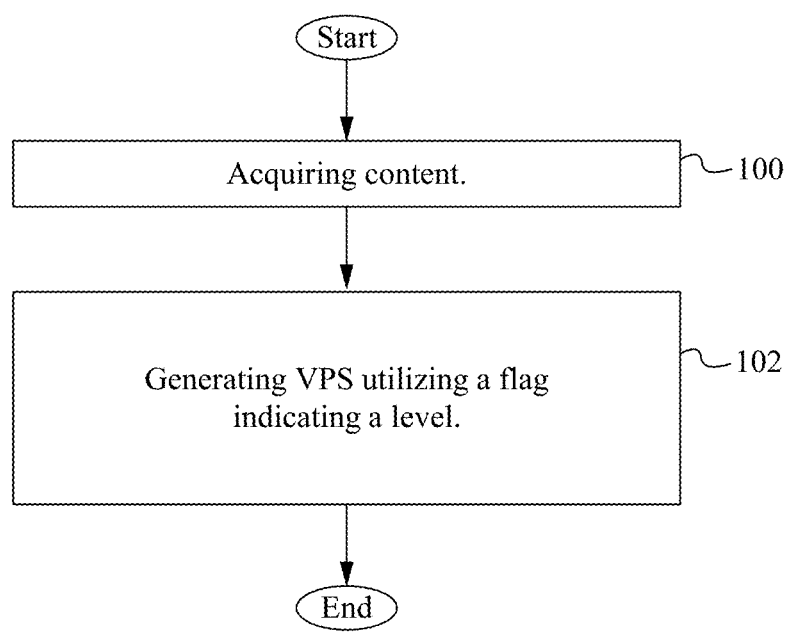
FIG. 1 illustrates a flowchart of a method of utilizing a modified VPS syntax according to some embodiments.

Described herein are updates for the profile_tier_level syntax structure to support additional flexibility for HEVC extensions while being used in vps_extensions( ) syntax structure for each layer or operating point.

Below is the profile_tier_level syntax structure presented in the current Draft International Standard (DIS) specification for High Efficiency Video Coding (HEVC).

| | Descriptor |
|---|---|
| profile_tier_level( profilePresentFlag, maxNumSubLayersMinus1) { | |
|   if(profilePresentFlag) { | |
|     general_profile_space | u(2) |
|     general_tier_flag | u(1) |
|     general_profile_idc | u(5) |
|     for (i= 0; i < 32; i++) | |
|       general_profile_compatibility_flag[i] | u(1) |
|     general_reserved_zero_16 bits | u(16) |
| } | |
|   general_level_idc | u(8) |
|   for (i= 0; i < maxNumSubLayersMinus1; i++) { | |
|     if(profilePresentFlag) | |
|       sub_layer_profile_present_flag[i] | u(1) |
|     sub_layer_level_present_flag[i] | u(1) |
|     if(profilePresentFlag && sub_layer_profile_present_flag+ i] | |
| { | |
|       sub_layer_profile_space[i] | u(2) |
|       sub_layer_tier_flag[i] | u(1) |
|       sub_layer_profile_idc[i] | u(5) |
|       for(j=0; j<32; j++) | |
|         sub_layer_profile_compatibility_flag[i][j] | u(1) |
|       sub_layer_reserved_zero_16bits[i] | u(16) |
|     } | |
|     if( sub_layer_level_present_flag[i]) | |
|       sub_layer_level_idc[i] | u(8) |
|   } | |
| } | |

The presence of the profile_tier_level related syntax parameters is currently conditioned (restricted) by an external parameter flag of profilePresentFlag used as a "passing" parameter in the profile_tier_level syntax structure in the DIS. The following table shows what parameters are able to be conditioned when this syntax structure is used in vps_extension( ) syntax structure to support various HEVC extensions requirements.

Selectable Syntax Parameters in the Current Profile_Tier_Level (DIS)

| profilePresentFlag | sub-layer_profile_present_flag | levelPresentFlag | sub_layer_level_present_flag | syntax parameters-general | syntax parameters_sub-layer |
|---|---|---|---|---|---|
| 0 | — | — | 0 | general_level_idc | — |
| 0 | — | — | 1 | general_level_idc | sub_layer_level_idc |
| 1 | 0 | — | 0 | general_profile_tier_level | — |
| 1 | 1 | — | 0 | general_profile_tier_level | sub_layer_profile_tier |
| 1 | 0 | — | 1 | general_profile_tier_level | sub_layer_level_idc |
| 1 | 1 | — | 1 | general_profile_tier_level | sub-layer_profile_tier_level |

It is apparent that one of the parameter-group, called "general_profile_tier" that contains general syntaxes for "profile_tier_only," cannot be a probable selection for use in vps_extension( ) syntax structure. In other words, all possible choices may not be possible with the existing profile_tier_level syntax structure. This is because of the absence of "levelPresentFlag," another conditional flag, either as an external passing parameter similar to "profilePresentFlag" or as an added syntax inside the profile_tier_level syntax structure.

In the current HEVC specifications, Profile and Tier-related parameters may be varied per Layer or Operating Point based upon setting the ProfilePresentFlag to 1 or 0. The Level parameters are always adapted in the General case, and if sub_layer_level_present_flag is present, then sub-layer related level parameters are able to be changed.

However, from the Profile/Tier/Level descriptions, the Level parameters are able to be common to some profile/tier cases and may change for other cases. There is the possibility that for the general case, Level parameters may change separately from Profile/Tier Parameter changes. In other words, Level parameters are able to be varied by setting a new flag of LevelPresentFlag to 1 or 0.

The following chart shows how all possible combinations of profile_tier and level parameters in a modified profile_tier_level syntax structure are possible during its application in vps_extension( ) when the "levelPresentFlag" is present as a passing parameter similar to "profilePresent-Flag" or as an added syntax inside the profile_tier_level syntax structure.

Selectable Syntax Parameters in the Updated Profile_Tier_Level

|  | Descriptor |
|---|---|
| profile_tier_level( profilePresentFlag, levelPresentFlag, maxNumSubLayersMinus1) { |  |
|   if(profilePresentFlag) { |  |
|     general_profile_space | u(2) |
|     general_tier_flag | u(1) |
|     general_profile_idc | u(5) |
|     for (i= 0; i < 32; i++) |  |
|       general_profile_compatibility_flag[i] | u(1) |
|     general_reserved_zero_16bits | u(16) |
|   } |  |
|   if(levelPresentFlag) |  |
|     general_level_idc | u(8) |
|   for (i= 0; i < maxNumSubLayersMinus1; i++) { |  |
|     if(profilePresentFlag) |  |
|       sub_layer_profile_present_flag[i] | u(1) |
|     sub_layer_level_presentflag[i] | u(1) |
|     if(profilePresentFlag && sub_layer_profile_present_flag[i] { |  |
|       sub_layer_profile_space[i] | u(2) |
|       sub_layer_tier_flag[i] | u(1) |
|       sub_layer_profile_idc[i] | u(5) |
|       for(j=0; j<32; j++) |  |
|         sub_layer_profile_compatibility_flag[i][j] | u(1) |
|       sub_layer_reserved_zero_16bits[i] | u(16) |
|     } |  |
|     if(levelPresentFlag && sub_layer_level_present_flag[i]) |  |
|       sub_layer_level_idc[i] | u(8) |
|   } |  |
| } |  |

The previously defined vps_extension( ) uses vps_profile_tier syntax structure with profilePresentFlag always set to 1 for all layers (i=1 to vps_max_layers_minus1) as shown below. There are no restrictions for profile_tier or level syntax parameters in general cases.

| profilePresentFlag | sub-layer_profile_present_flag | levelPresentFlag | sub_layer_level_present_flag | syntax parameters-general | syntax parameters_sub-layer |
|---|---|---|---|---|---|
| 0 | — | 0 | — | — | — |
| 0 | — | 1 | 0 | general_level_idc | — |
| 0 | — | 1 | 1 | general_level_idc | sub_layer_level_idc |
| 1 | 0 | 0 | — | general_profile_tier | — |
| 1 | 1 | 0 | — | general_profile_tier | sub_layer_profile_tier |
| 1 | 0 | 1 | 0 | general_profile_tier_level | — |
| 1 | 1 | 1 | 1 | general_profile_tier_level | sub_layer_profile_tier_level |

1) profilePresentFlag enables restrictions (presence) of profile and tier syntaxes in the syntax structure above for both general and sub-layer cases 2) no such flag is present to affect (restrict) the LevelIDC syntax parameters for both general and sub-layer cases in the current_profile_tier_level syntax structure. Thus, no restrictions on the presence of LevelIDC is able to be imposed either for a layer or an Operating Point (OP) in vps_extension( ).

3) The profile_tier_level syntax structure is able to be updated as follows: use of "levelPresentFlag" as a passing parameter similar to "profilePresentFlag," or insert levelPresentFlag as a new 1-bit syntax.

An updated profile_tier_level syntax structure is shown below with levelPresent Flag as a passing parameter, similar to profilePresentFlag.

|  | Descriptor |
|---|---|
| vps_extension( ) { |  |
|   while(!byte_aligned( )) |  |
|     vps_extension_byte_alignment_reserved_one_bit | u(1) |
|   avc_base_codec_flag | u(1) |
|   scalability_mask | u(16) |
|   for(i=0;i<NumScalabilityTypes;i++) { |  |
|     dimension_id_len_minus1[i] | u(3) |
|   } |  |
|   vps_nuh_layer_id_present_flag | u(1) |
|   //layer specific information |  |
|   for (i=1; i<=vps_max_layers_minus1; i++) { |  |
|     //mapping of layer ID to scalability dimension Ids |  |
|     if (vps_nuh_layer_id_present_flag) |  |

-continued

| | Descriptor |
|---|---|
| layer_id_in_nuh[i] | u(6) |
|   for (j=0; j<=num_dimensions_minus1; j++) | |
|     dimension_id[i][j] | u(v) |
| } | |
| for(i=1;i<vps_max_layers_minus1;i++) { | |
|   profile_tier_level(1,vps_max_sub_layers_minus1) | |
| for(i=1;i<vps_max_layers_minus1;i++) { | |
|   //layer dependency | |
|   num_direct_ref_layers[i] | u(6) |
|   for(j=0; j<num_direct_ref_layers[i];j++) | |
|     ref_layer_id[i][j] | u(6) |
| } | |
| } | |

In the following sections, two ways of restricting such syntax parameters of profile_tier and/or levels while the modified profile_tier_level syntax structure being used in vps_extension( ) with either layer-specific or operation-point (OP) specific updates are implemented.

Layer-Specific Updates of Profile_Tier_Level in Vps_Extension( )

| | Descriptor |
|---|---|
| vps_extension( ) { | |
| ............Edited.................. | |
|   for (i=1; i<=vps_max_layers_minus1; i++) { | |
|     vps_profile_present_flag[i] | u(1) |
|     vps_level_present_flag[i] | u(1) |
|     profile_tier_level(vps_profile_present_flag[i], | |
| vps_level_present_flag[i], vps_max_sub_layers_minus1) | |
|   if(!vps_profile_present_flag[i]) | |
|     vps_profile_ref_layer_num[i] | u(8) |
|   else | |
|     vps_profile_ref_layer_num[i] = i | |
|   if (!vps_level_present_flag[i]) | |
|     vps_level_ref_layer_num[i] | u(8) |
|   else | |
|     vps_level_ref_layer_num[i] = i | |
| ............Edited.................. | |
| } | |

In the above syntax structure, four new syntax parameters are introduced:

vps_profile_present_flag[i]: When this flag is equal to 1, this specifies the profile information for Layer i is present in the profile_tier_level( ) syntax structure. When this flag is equal to 0, this specifies that profile information for Layer i is not present in the profile_tier_level( ) syntax structure.

vps_profile_ref_layer_num[i]: When vps_profile_present_flag[i] is equal to 0, profile information for Layer i is inferred to be equal to the profile information of the Layer indicated by vps_profile_ref_layer_num[i], a Layer-number used as an index to a Reference Profile-Tier_Level Lookup table storing such information of previously sent layers.

vps_level_present_flag[i]: When this flag is equal to 1, this specifies the level information for Layer i is present in the profile_tier_level( ) syntax structure. When this flag is equal to 0, this specifies that level information for Layer i is not present in the profile_tier_level( ) syntax structure.

vps_level_ref_layer_num[i]: When vps_level_present flag [i] is equal to 0, level information for Layer i is inferred to be equal to the level information of the Layer indicated by vps_level_ref_layer_num[i], a Layer-number used as an index to a Reference Profile-Tier-Level Lookup Table storing such information of previously sent Layers.

The combined effect of the values of vps_profile_present flag and vps_level_present_flag is shown in the chart below, where such syntax parameter flags are present in the modified vps_extension( ) syntax structure shown above.

| vps_profile_present_flag | vps_level_present_flag | Available Syntax parameters |
|---|---|---|
| 0 | 0 | (Reference-Profile/Tier, LevelIdc) |
| 0 | 1 | (Reference-Profile/Tier), LevelIdc |
| 1 | 0 | Profile/Tier, (Reference-LevelIdc) |
| 1 | 1 | Profile/Tier, LevelIdc |

As an example, in case of both "vps_profile_present_flag" and "vps_level_present_flag" being 0 (above chart), the available syntax parameters are "(Reference—Profile/Tier, LevelIdc)", and this means all such parameters are available from the stored or "Reference" lookup tables when such parameters are sent earlier. Such reference parameters are already explained in the two syntax parameters of vps_profile_ref_layer_num and vps_level_ref_layer_num. Use of such "vps_profile_present_flag" and "vps_level_present_flag" helps in avoiding unknown conditions.

OP-Specific Updates of Profile_Tier_Level in Vps_Extension( )

| | Descriptor |
|---|---|
| vps_extension( ) { | |
| ............Edited.................. | |
|   for (i=0; i<=vps_max_layers_minus1; i++) { | |
|     vps_profile_present_flag[i] | u(1) |
|     vps_level_present_flag[i] | u(1) |
|     profile_tier_level(vps_profile_present_flag[i], | |
| vps_level_present_flag[i], vps_max_sub_layers_minus1) | |
|   if(!vps_profile_present_flag[i]) | |
|     vps_profile_ref_op_num[i] | u(8) |
|   else | |
|     vps_profile_ref_op_num[i] = i | |
|   if (!vps_level_present_flag[i]) | |
|     vps_level_ref_op_num[i] | u(8) |
|   else | |
|     vps_level_ref_op_num[i] = i | |
| ............Edited.................. | |
| } | |

In the above syntax structure, four new syntax parameters are introduced, similar to "Level-specific update" case in the previous section.

vps_profile_present_flag[i]: When this flag is equal to 1, this specifies the profile information for Operation point i (or OP i) is present in the profile_tier_level( ) syntax structure. When this flag is equal to 0, this specifies that profile information for OP i is not present in the profile_tier_level( )) syntax structure.

vps_profile_ref_op_num[i]: When vps_profile_present_flag [i] is equal to 0, profile information for OP i is inferred to be equal to the profile information of the OP indicated by vps_profile_refjayer_num[i], a OP-number used as an index to a Reference Profile-Tier-Level Lookup Table storing such information of previously sent OPs.

vps_level_present_flag[i]: When this flag is equal to 1, this specifies the level information for OP i is present in the profile_tier_level( ) syntax structure. When this flag is equal to 0, this specifies that level information for OP i is not present in the profile_tier_level( ) syntax structure.

vps_level_ref_op_num[i]: When vps_level_present_flag[i] is equal to 0, level information for OP i is inferred to be equal to the level information of the OP indicated by vps_level_ref_layer_num[1], an OP-number used as an index to a Reference Profile-Tier-Level Lookup Table storing such information of previously sent OPs.

If this new flag of "LevelPresentFlag" is used for the "profile_tier_level" syntax structure, then it is initialized in VPS and SPS as follows:

| | Descriptor |
|---|---|
| video_parameter_set_rbsp( ) {<br>......................Edited............................<br>profile_tier_level(1, 1, vps_max_sub_layers_minus1)<br>......................Edited............................<br>} | |

| | Descriptor |
|---|---|
| seq_parameter_set_rbsp( ) {<br>......................Edited............................<br>if (nuh_layer_id == 0)<br>   profile_tier_level(1, 1, sps_max_sub_layers_minus1)<br>......................Edited............................<br>} | |

As described herein, an update for the profile_tier_level syntax structure is made to support additional flexibilities in selecting profile_tier and level parameters for HEVC extensions in scalable video coding, multi-view coding and 3D video coding areas. After this, this modified syntax structure is used in the vps_extension( ) syntax structure where the profile_tier and level syntax parameters are restricted in two possible ways, either for each layer or for each operating point.

FIG. 1 illustrates a flowchart of a method of utilizing a modified VPS syntax according to some embodiments. In the step 100, content (e.g., a video) is acquired. The content is able to be acquired in any manner such as copied, downloaded, captured using a sensor or any other way. In the step 102, VPS data is generated utilizing a flag indicating a level. Additionally, the VPS data is generated using additional flags and data to indicate levels and/or operation points. The VPS data contains various HEVC Extension information in scalable video coding, multi-view coding and 3D video coding areas. In some embodiments, the VPS data provides flexibility in profiles/tiers/levels information. In some embodiments, additional or fewer steps are implemented. In some embodiments, the order of the steps is modified.

Figure 2:
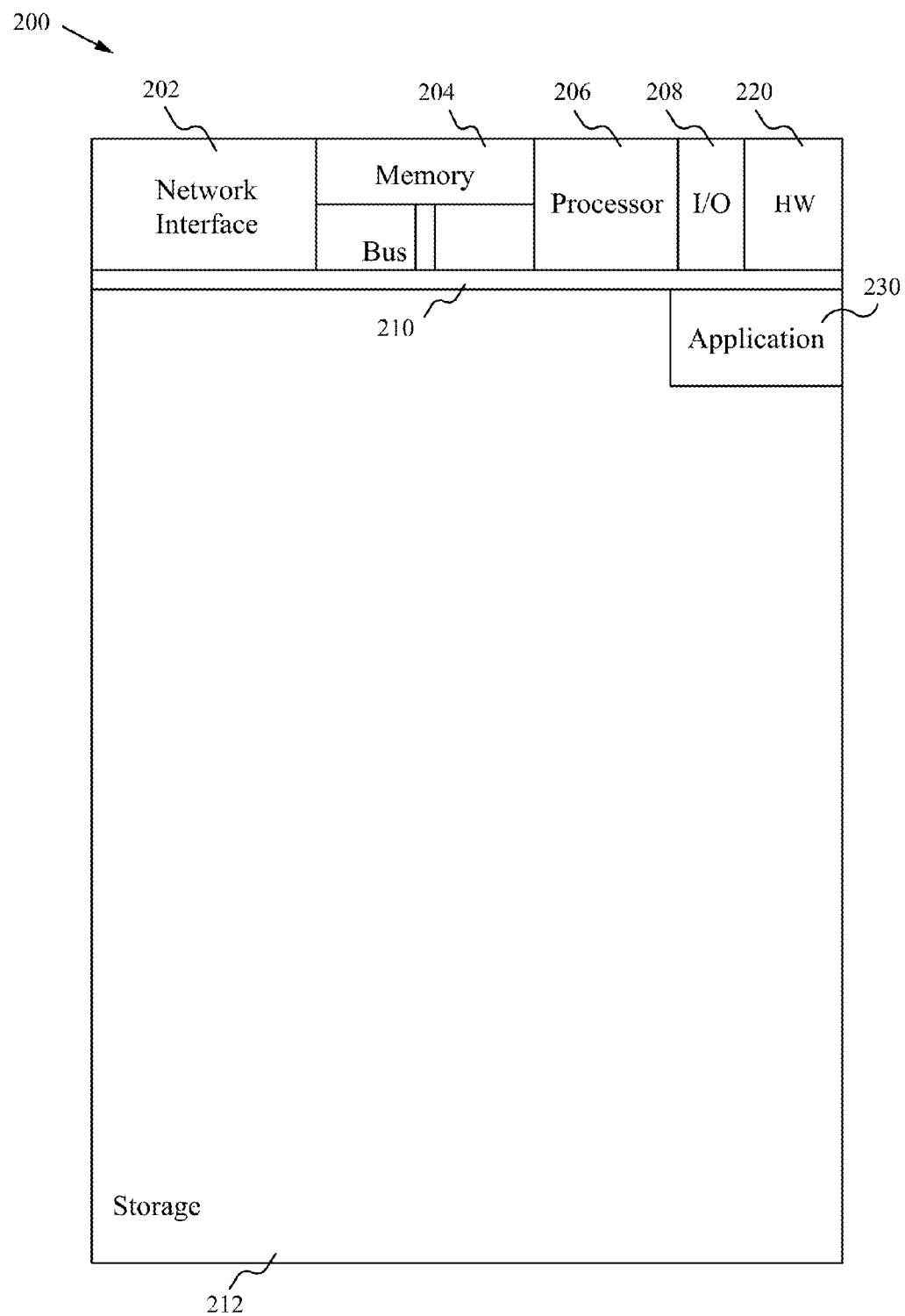
FIG. 2 illustrates a block diagram of an exemplary computing device configured to implement the modified VPS method according to some embodiments.

FIG. 2 illustrates a block diagram of an exemplary computing device configured to implement the modified VPS method according to some embodiments. The computing device 200 is able to be used to acquire, store, compute, process, communicate and/or display information such as images and videos. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, Blu-ray®, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. Modified VPS application(s) 230 used to perform the modified VPS method are likely to be stored in the storage device 212 and memory 204 and processed as applications are typically processed. More or fewer components shown in FIG. 2 are able to be included in the computing device 200. In some embodiments, modified VPS hardware 220 is included. Although the computing device 200 in FIG. 2 includes applications 230 and hardware 220 for the modified VPS method, the modified VPS method is able to be implemented on a computing device in hardware, firmware, software or any combination thereof. For example, in some embodiments, the modified VPS applications 230 are programmed in a memory and executed using a processor. In another example, in some embodiments, the modified VPS hardware 220 is programmed hardware logic including gates specifically designed to implement the modified VPS method.

In some embodiments, the modified VPS application(s) 230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

Figure 3:
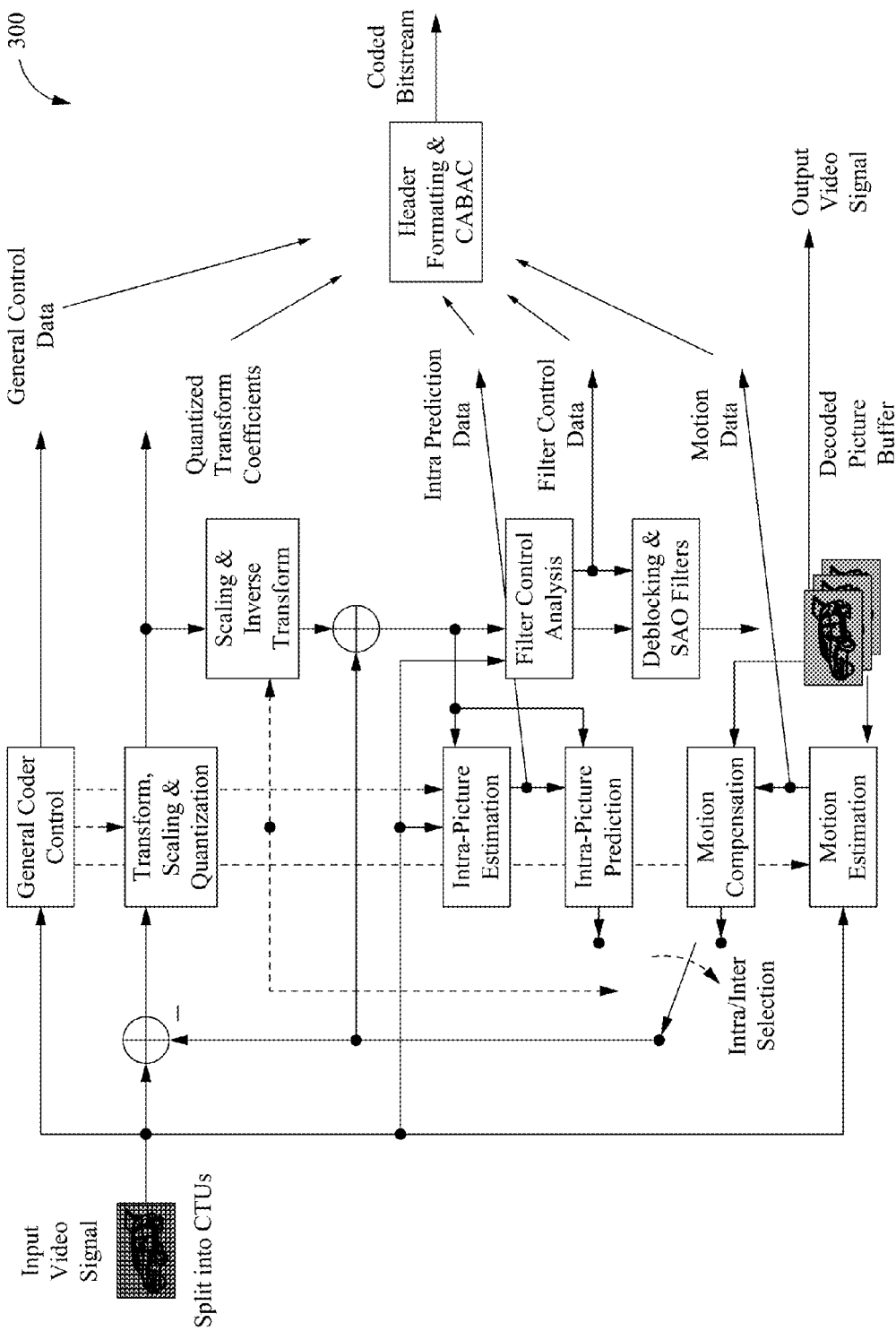
FIG. 3 illustrates a general diagram of an HEVC encoder according to some embodiments.

FIG. 3 illustrates a general diagram of an HEVC encoder according to some embodiments. The encoder 300 includes a general coder control component, a transform scaling and quantization component, a scaling and inverse transform component, an intra-picture estimation component, a filter control analysis component, an intra-picture prediction component, a deblocking and SAO filters component, a motion compensation component, a motion estimation component, and a header formatting and CABAC component. An input video signal is received by the encoder 300 and is split into Coding Tree Units (CTUs). The HEVC encoder components process the video data using the modified VPS and generate a coded bitstream.

Figure 4:
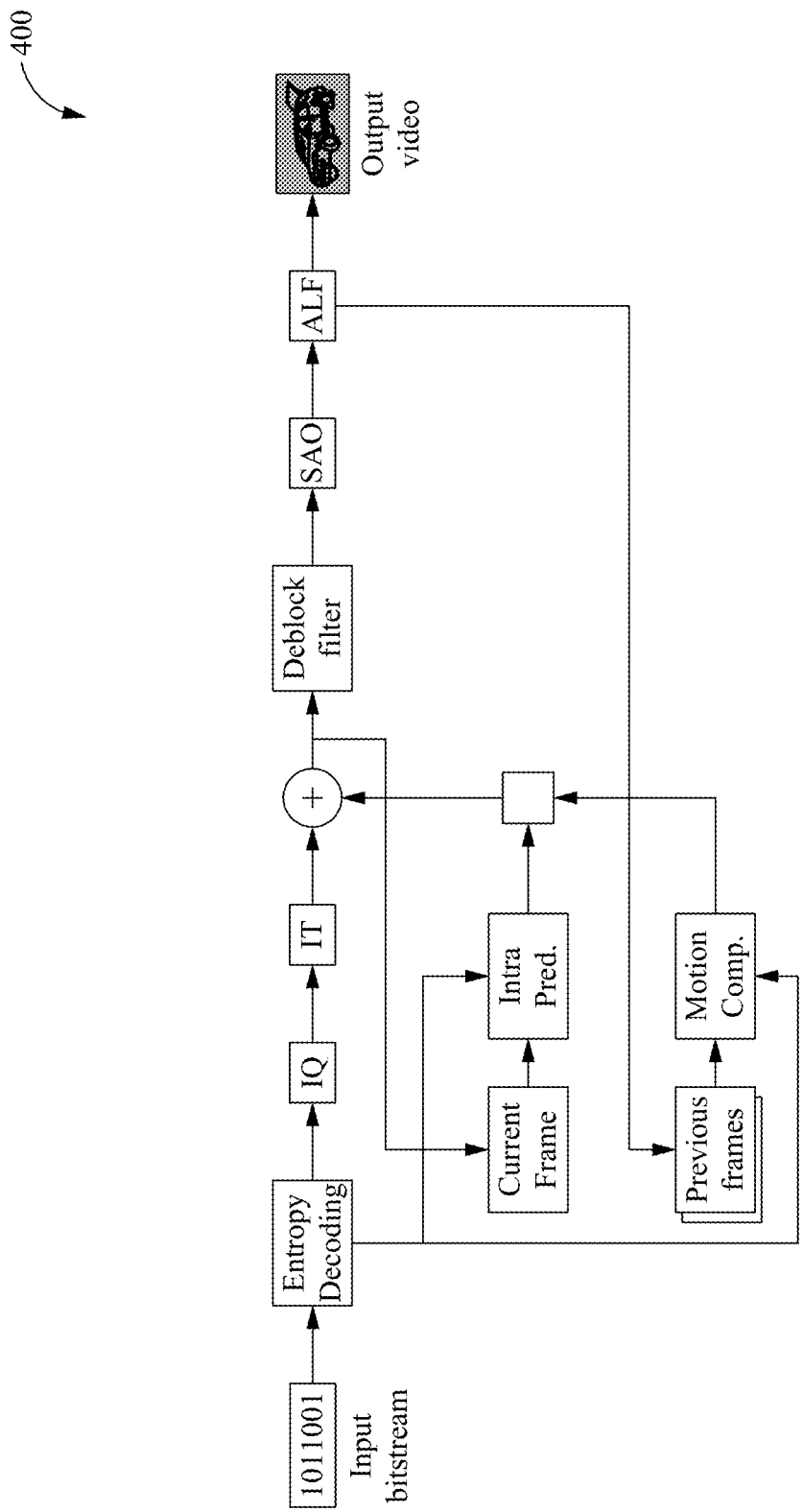
FIG. 4 illustrates a general diagram of an HEVC decoder according to some embodiments.

FIG. 4 illustrates a general diagram of an HEVC decoder according to some embodiments. The decoder 400 includes an entropy decoding component, an inverse quantization component, an inverse transform component, a current frame component, an intra prediction component, a previous frames component, a motion compensation component, a deblocking filter, an SAO component and an adaptive loop filter. An input bitstream (e.g., a coded video) is received by the decoder 400, and a decoded bitstream is generated for display. In some embodiments, the modified VPS is utilized while decoding.

To utilize the modified VPS method, devices are able to access parameters in VPS and its extension for scalable video coding, multi-view coding, 3D video coding and mixed video sequences. The modified VPS method is automatically used when performing video processing or other times. The modified VPS method is able to be implemented automatically without user involvement.

In operation, the VPS and vps_extension( ) syntax structures are updated with some cleanups for the HEVC Extensions in scalable video coding, multi-view coding and 3D video coding areas. The VPS is generated using the modified syntax structure.

U.S. patent application Ser. No. 14/035,680, titled "VIDEO PARAMETER SET (VPS) SYNTAX RE-ORDERING FOR EASY ACCESS OF EXTENSION PARAMETERS", now U.S. Pat. No. 9,992,490 and U.S. patent application Ser. No. 14/035,711, titled "JCTVC-L0226: VPS AND VPS EXTENSION UPDATES", now U.S. Pat. No. 10,219,006 are hereby incorporated by reference in their entireties for all purposes.

SOME EMBODIMENTS OF JCTVC-L0227: VPS_EXTENSION WITH UPDATES OF PROFILE-TIER-LEVEL SYNTAX STRUCTURE

1. A method programmed in a non-transitory memory of a device comprising:
   1. acquiring content; and
   2. generating a video parameter set of the content utilizing a level flag indicating a level within the content.
2. The method of clause 1 wherein the flag is an external passing parameter.
3. The method of clause 1 wherein the flag is added syntax within a profile_tier_level syntax structure.
4. The method of clause 1 wherein generating the video parameter set includes using a profile present flag, further wherein when the profile present flag is equal to 1, then profile information for a layer is present in a profile tier level syntax structure, and when the profile present flag is equal to 0, then the profile information for the layer is not present in the profile tier level syntax structure.
5. The method of clause 4 wherein generating the video parameter set includes using a profile reference layer number, further wherein when the profile present flag is equal to 0, then profile information for the layer is inferred to be equal to the profile information of the layer indicated by the profile reference layer number.
6. The method of clause 1 wherein generating the video parameter set includes using a level present flag, further wherein when the level present flag is equal to 1, then level information for a layer is present in a profile tier level syntax structure, and when the level present flag is equal to 0, then the level information for layer is not present in the profile tier level syntax structure.
7. The method of clause 1 wherein generating the video parameter set includes using a level reference layer number, further wherein the level reference layer number is equal to 0, level information for a layer is inferred to be equal to the level information of the layer indicated by the level reference layer number.
8. The method of clause 1 wherein generating the video parameter set includes using a profile present flag, further wherein when this flag is equal to 1, then profile information for an operation point is present in a profile tier level syntax structure, and when this flag is equal to 0, then the profile information for the operation point is not present in the profile tier level syntax structure.
9. The method of clause 8 wherein generating the video parameter set includes using a profile reference layer number, further wherein when the profile present flag is equal to 0, then profile information for the operation point is inferred to be equal to the profile information of the operation point indicated by the profile reference layer number.
10. The method of clause 1 wherein generating the video parameter set includes using a level present flag, further wherein when the level present flag is equal to 1, then level information for a operation point is present in a profile tier level syntax structure, and when the level present flag is equal to 0, then the level information for the operation point is not present in the profile tier level syntax structure.
11. The method of clause 1 wherein generating the video parameter set includes using a level reference layer number, further wherein the level reference layer number is equal to 0, level information for a operation point is inferred to be equal to the level information of the operation point indicated by the level reference layer number.
12. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
13. A method programmed in a non-transitory memory of a device comprising:
    1. acquiring content; and
    2. generating a video parameter set of the content utilizing a level flag indicating a level within the content, wherein generating the video parameter set includes using a profile present flag, further wherein when the profile present flag is equal to 1, then profile information for a layer is present in a profile tier level syntax structure, and when the profile present flag is equal to 0, then the profile information for the layer is not present in the profile tier level syntax structure, further wherein when the profile present flag is equal to 0, then profile information for the layer is inferred to be equal to the profile information of the layer indicated by the profile reference layer number, further wherein when the level present flag is equal to 1, then level information for a layer is present in a profile tier level syntax structure, and when the level present flag is equal to 0, then the level information for layer is not present in the profile tier level syntax structure, further wherein the level reference layer number is equal to 0, level information for a layer is inferred to be equal to the level information of the layer indicated by the level reference layer number.
14. An apparatus comprising:
    1. a non-transitory memory for storing an application, the application for:
       1. acquiring content; and
       2. generating a video parameter set of the content utilizing a level flag indicating a level within the content; and
    2. a processing component coupled to the memory, the processing component configured for processing the application.
15. The apparatus of clause 14 wherein the flag is an external passing parameter.
16. The apparatus of clause 14 wherein the flag is added syntax within a profile tier level syntax structure.
17. The apparatus of clause 14 wherein generating the video parameter set includes using a profile present flag, further wherein when the profile present flag is equal to 1, then profile information for a layer is present in a profile tier level syntax structure, and when the profile present flag is equal to 0, then the profile information for the layer is not present in the profile tier level syntax structure.

18. The apparatus of clause 17 wherein generating the video parameter set includes using a profile reference layer number, further wherein when the profile present flag is equal to 0, then profile information for the layer is inferred to be equal to the profile information of the layer indicated by the profile reference layer number.

19. The apparatus of clause 14 wherein generating the video parameter set includes using a level present flag, further wherein when the level present flag is equal to 1, then level information for a layer is present in a profile tier level syntax structure, and when the level present flag is equal to 0, then the level information for layer is not present in the profile tier level syntax structure.

20. The apparatus of clause 14 wherein generating the video parameter set includes using a level reference layer number, further wherein the level reference layer number is equal to 0, level information for a layer is inferred to be equal to the level information of the layer indicated by the level reference layer number.

21. The apparatus of clause 14 wherein generating the video parameter set includes using a profile present flag, further wherein when this flag is equal to 1, then profile information for an operation point is present in a profile tier level syntax structure, and when this flag is equal to 0, then the profile information for the operation point is not present in the profile tier level syntax structure.

22. The apparatus of clause 21 wherein generating the video parameter set includes using a profile reference layer number, further wherein when the profile present flag is equal to 0, then profile information for the operation point is inferred to be equal to the profile information of the operation point indicated by the profile reference layer number.

23. The apparatus of clause 14 wherein generating the video parameter set includes using a level present flag, further wherein when the level present flag is equal to 1, then level information for a operation point is present in a profile tier level syntax structure, and when the level present flag is equal to 0, then the level information for the operation point is not present in the profile tier level syntax structure.

24. The apparatus of clause 14 wherein generating the video parameter set includes using a level reference layer number, further wherein the level reference layer number is equal to 0, level information for a operation point is inferred to be equal to the level information of the operation point indicated by the level reference layer number.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method, comprising:
acquiring a bitstream; and
decoding the bitstream to generate image data, wherein
for a profile present flag of a first layer in the bitstream that is equal to 1, the image data is generated by using the profile present flag of the first layer in the bitstream,
for the profile present flag of the first layer in the bitstream that is equal to 0, a syntax of the bitstream specifies that profile information of the first layer is absent in a profile tier level syntax structure, the image data is generated by using profile information of a second layer indicated by a profile reference layer number, and
the profile reference layer number is an index to a Reference Profile-Tier_Level Lookup table that stores information of the second layer in the bitstream.

2. A method, comprising:
decoding a bitstream to generate image data, wherein
for a profile present flag of a first operation point in the bitstream that is equal to 1, the image data is generated by using the profile present flag of the first operation point in the bitstream,
for the profile present flag of the first operation point in the bitstream that is equal to 0, a syntax of the bitstream specifies that profile information for the first operation point is absent in a profile tier level syntax structure, and the image data is generated by using profile information of a second operation point indicated by a profile reference layer number, and
the profile reference layer number is an index to a Reference Profile-Tier_Level Lookup table that stores information of the second operation point in the bitstream.

3. The method of claim 2, further comprising decoding the bitstream which is split into encoding tree units.

4. A device, comprising:
a decoder configured to:
decode a bitstream to generate image data, wherein
for a profile present flag of a first operation point in the bitstream that is equal to 1, the image data is generated by using the profile present flag of the first operation point in the bitstream,
for the profile present flag of the first operation point in the bitstream that is equal to 0, a syntax of the bitstream specifies that profile information of the first operation point is absent in a profile tier level syntax structure, and the image data is generated by using profile information of a second operation point indicated by a profile reference layer number, and
the profile reference layer number is an index to a Reference Profile-Tier_Level Lookup table that stores information of the second operation point in the bitstream.

5. The device of claim 4, wherein the decoder is further configured to decode the bitstream that is split into encoding tree units.

6. The method of claim 1, further comprising decoding the bitstream which is split into encoding tree units.

7. The method of claim 2, wherein for a level reference layer number that is equal to 0, level information for the first operation point is inferred to be equal to the level information of the second operation point indicated by the level reference layer number.

* * * * *